US011492510B2

(12) United States Patent
Cassaday et al.

(10) Patent No.: US 11,492,510 B2
(45) Date of Patent: Nov. 8, 2022

(54) PROTECTIVE GRAFT COATING FOR APPLICATION ONTO POLYURETHANE FOR CHEMICAL RESISTANCE, STAIN RESISTANCE, ABRASION RESISTANCE AND U.V. RESISTANCE

(71) Applicant: ERGO-INDUSTRIAL SEATING SYSTEMS INC., Mississauga (CA)

(72) Inventors: Terry Cassaday, Mississauga (CA); John Ryan, Bellmore, NY (US); Paul Thottathil, New Hyde Park, NY (US); Purushothaman Kesavan, Franklin Square, NY (US); Satyabrata Mukherjee, Westbury, NY (US)

(73) Assignee: ERGOCENTRIC INC., Mississauga (CA)

( * ) Notice: Subject to any disclaimer, the term of this patent is extended or adjusted under 35 U.S.C. 154(b) by 0 days.

(21) Appl. No.: 15/625,076

(22) Filed: Jun. 16, 2017

(65) Prior Publication Data

US 2018/0362800 A1   Dec. 20, 2018

(51) Int. Cl.
| | |
|---|---|
| *C09D 175/04* | (2006.01) |
| *C09D 133/02* | (2006.01) |
| *C09D 127/12* | (2006.01) |
| *C08G 59/00* | (2006.01) |
| *C08L 27/00* | (2006.01) |
| *C08G 18/62* | (2006.01) |
| *C09D 127/16* | (2006.01) |
| *C08G 18/08* | (2006.01) |
| *C09D 151/08* | (2006.01) |
| *C08F 299/08* | (2006.01) |
| *C08F 299/06* | (2006.01) |

(52) U.S. Cl.
CPC .......... *C09D 175/04* (2013.01); *C08F 299/06* (2013.01); *C08F 299/08* (2013.01); *C08G 18/0819* (2013.01); *C08G 18/6225* (2013.01); *C08G 59/00* (2013.01); *C08L 27/00* (2013.01); *C09D 127/12* (2013.01); *C09D 127/16* (2013.01); *C09D 133/02* (2013.01); *C09D 151/08* (2013.01)

(58) Field of Classification Search
None
See application file for complete search history.

(56) References Cited

U.S. PATENT DOCUMENTS

| | | | |
|---|---|---|---|
| 3,188,228 A | 6/1965 | Magat et al. | |
| 3,586,649 A | 6/1971 | Cobbledick et al. | |
| 3,698,931 A * | 10/1972 | Horowitz | C08J 7/16 |
| | | | 427/399 |
| 3,873,407 A | 3/1975 | Kumata et al. | |
| 3,998,602 A | 12/1976 | Horowitz et al. | |
| 4,107,228 A * | 8/1978 | Horowitz | C08F 283/006 |
| | | | 427/386 |
| 4,814,546 A | 3/1989 | Whitney et al. | |
| 4,875,410 A | 10/1989 | Lee et al. | |
| 5,050,256 A | 9/1991 | Woodcock | |
| 5,207,873 A * | 5/1993 | Sanduja | D21F 1/0027 |
| | | | 162/358.2 |
| 5,278,200 A | 1/1994 | Courey et al. | |
| 5,352,712 A * | 10/1994 | Shustack | C03C 25/106 |
| | | | 385/123 |
| 5,374,362 A * | 12/1994 | McFarland | D06M 13/35 |
| | | | 106/2 |
| 5,407,728 A * | 4/1995 | Kerr | B60R 21/235 |
| | | | 139/420 A |
| 5,439,969 A * | 8/1995 | Sanduja | C09D 4/06 |
| | | | 524/398 |
| 5,486,210 A | 1/1996 | Kerr et al. | |
| 5,552,472 A | 9/1996 | Kerr et al. | |
| 5,705,083 A * | 1/1998 | Wyss | C08K 5/3435 |
| | | | 106/243 |
| 5,741,548 A | 4/1998 | Sanduja et al. | |
| 5,785,791 A * | 7/1998 | Letterman, Jr. | C09D 4/00 |
| | | | 156/242 |
| 5,810,889 A * | 9/1998 | Kaufmann | C11D 3/42 |
| | | | 252/301.23 |
| 5,938,993 A | 8/1999 | Greene | |
| 6,001,894 A | 12/1999 | Ottersbach et al. | |
| 6,174,854 B1* | 1/2001 | Hofer | C11D 1/62 |
| | | | 510/516 |
| 6,358,557 B1 | 3/2002 | Wang et al. | |
| 6,368,587 B1 | 4/2002 | Anders et al. | |

(Continued)

OTHER PUBLICATIONS

Chemtan AC Safety Data Sheet.
Kynar ARC Technical Data Sheet.

*Primary Examiner* — Robert S Loewe
(74) *Attorney, Agent, or Firm* — Eugene J. A. Gierczak; Gardiner Roberts LLP

(57) ABSTRACT

This invention relates to a coating comprising prepolymer and monomers for application onto polyurethane for chemical resistance, abrasion resistance, water proof etc. Usually polyurethane is porous and does not have sufficient stain, abrasion and chemical resistance. The said coatings developed using technology of chemical grafting that involves the use of prepolymers, monomers, catalyst, graft initiator, wetting agents, fillers and other ingredients of the composition. The coating thus obtained when applied on the polyurethane allows obtaining graft polymerization, thereby forming a polymeric film chemically attached to the substrate. The polyurethane substrate is reacted with craft initiator which creates the reaction sites on the substrate via free radical mechanism. This in turn renders the substrate receptive to attachment of monomers/prepolymers forming polymeric film that is chemically bonded to the substrate which has then the desired property in terms of stain resistance, abrasion wear, crock, water, chemical resistance and other properties.

15 Claims, No Drawings

(56) References Cited

U.S. PATENT DOCUMENTS

| | | | | |
|---|---|---|---|---|
| 6,391,065 B1 * | 5/2002 | Cooke | | D06P 1/0024 |
| | | | | 252/301.25 |
| 6,414,048 B1 * | 7/2002 | Sanduja | | C08J 7/18 |
| | | | | 522/42 |
| 6,482,529 B2 | 11/2002 | Sanduja et al. | | |
| 6,518,351 B1 * | 2/2003 | Alanzo | | C08F 220/22 |
| | | | | 524/501 |
| 6,531,440 B1 * | 3/2003 | White | | C11D 3/3742 |
| | | | | 510/244 |
| 6,638,319 B2 | 10/2003 | Sanduja et al. | | |
| 6,673,889 B1 * | 1/2004 | Weinert | | C08F 290/06 |
| | | | | 525/123 |
| 6,726,960 B1 | 4/2004 | Sanduja et al. | | |
| 7,157,018 B2 * | 1/2007 | Scheidler | | C14C 9/00 |
| | | | | 106/285 |
| 7,323,435 B1 * | 1/2008 | Turri | | C08G 18/0814 |
| | | | | 508/446 |
| 7,824,566 B2 * | 11/2010 | Scheidler | | D06M 13/35 |
| | | | | 252/8.61 |
| 2002/0183414 A1 | 12/2002 | LalSanduja et al. | | |
| 2003/0046770 A1 | 3/2003 | Sanduja et al. | | |
| 2003/0113497 A1 | 6/2003 | Buono et al. | | |
| 2004/0071912 A1 | 4/2004 | Berth | | |
| 2005/0285072 A1 * | 12/2005 | Galen | | D06M 15/277 |
| | | | | 252/8.62 |
| 2006/0106157 A1 * | 5/2006 | Sawant | | C08G 18/6229 |
| | | | | 524/589 |
| 2007/0160850 A1 * | 7/2007 | Zhang | | B27K 3/15 |
| | | | | 428/421 |
| 2008/0007029 A1 | 1/2008 | Keshavaraj | | |
| 2011/0200655 A1 | 8/2011 | Black et al. | | |
| 2012/0183789 A1 * | 7/2012 | Smith | | C04B 41/009 |
| | | | | 428/447 |
| 2012/0252997 A1 * | 10/2012 | Yang | | C07C 69/653 |
| | | | | 526/292.2 |
| 2014/0037838 A1 * | 2/2014 | Thottathil | | C09D 5/004 |
| | | | | 427/157 |
| 2014/0335362 A1 | 11/2014 | Cassaday et al. | | |
| 2015/0218329 A1 * | 8/2015 | Ishihara | | C09D 5/00 |
| | | | | 428/409 |

\* cited by examiner

PROTECTIVE GRAFT COATING FOR APPLICATION ONTO POLYURETHANE FOR CHEMICAL RESISTANCE, STAIN RESISTANCE, ABRASION RESISTANCE AND U.V. RESISTANCE

FIELD OF INVENTION

The invention relates to a method and a coating composition for application onto polyurethane to chemically graft a protective coating having improved physical properties of stain resistance, longer shelf life and improved UV resistance for use in the manufacture of seating systems and beds. The invention also relates to a method, coating and composition having an admixture of at least one monomer or prepolymer with fluropolymers, and particularly Fluro Prepolymer Lumiflor having superior characteristics or attributes for the healthcare or food industry environment such as hospitals and the like, where over time many of the exterior surfaces of beds, chairs and the like break down or become breeding grounds for bacteria, viruses and the like.

BACKGROUND OF THE INVENTION

Vinyl is commonly used in seating systems and other articles. A more durable alternative to vinyl is polyurethane but generally speaking polyurethane is a porous material and does not have sufficient stain, abrasion and chemical resistance. Furthermore, vinyl is commonly used in the healthcare environment such as hospitals or the like, as material for seating and beds. However, vinyl is easily punctured or torn and over time the exterior surface of vinyl beds and chairs break down, so as to provide areas where bacteria, viruses, bed bugs or the like can breed.

The present invention relates to a chemical resistant grafted coating applied to polyurethane for use in seating, beds and other articles. It also relates to a method of grafting a protective coating on polyurethane parts for stain, abrasion and chemical resistance, water resistance and other adverse effects of the environment.

In particular, this invention relates to a polymeric composition for application onto polyurethane for chemical resistance, abrasion resistance, stain resistance, water proof etc. Usually the polyurethane does not have water proof, chemical resistance. The coating developed herein uses technology of chemical grafting that involves the use of prepolymers, monomers, catalyst, graft initiator, wetting agents, fillers and other ingredients of the composition. The coating thus obtained when applied on the polyurethane allows to obtain graft polymerization, thereby forming a polymeric film chemically attached to the substrate. The polyurethane substrate is reacted with graft initiator which creates the reaction sites on the substrate via free radical mechanism. This in turn renders the substrate receptive to attachment of monomers/prepolymers thus forming the polymeric film is chemically bonded to the substrate which has then the desired property in terms of stain resistance, abrasion, wear, crock, water, chemical, and U.V. resistance.

Even when the polyurethane is coated with commercial coatings, it does not have the desired properties. These coatings adhere to the substrate through only physical bonds, that can be readily dislodged from the polyurethane substrate over a short period of time as moisture, oxygen and other corrosive gases permeate beneath the physically bonded commercial coating on the polyurethane substrate. Thus, there is a need for a chemically bonded coating for polyurethane against abrasion and staining, healthcare cleaning and disinfecting agents and to reduce porosity.

General

Grafting by definition means to transplant or to be transplanted from one body to another in such a way that the new growth can continue. Similarly, chemical grafting involves the transplantation of monomers to various substrates, to improve their positive properties without any basic change to the substrate itself.

The invention as described herein uses monomers/prepolymers as grafting components and graft initiators to start and continue the grafting process.

Originally, grafting has been done by using various types of electromechanical and electronic devices which performed very well, but as the pace of technological advancement quickened, such equipment became either too expensive or inadequate. Prior art devices that have been and still are used are: gamma radiation, X-ray, Corona discharge, sputtering and other similar methods.

Chemical grafting on the other hand generally relates to chemical bonding and may be divided into three basic areas depending on their functional capability. They are:

1. Coatings

As the term implies, surface characteristics of a substrate are changed by applying a coating. Coatings may be used to improve the appearance of the substrate, for corrosion protection, for electrical insulation, or adhering two materials together and the like. In each case, conventional coatings adhere to substrates by simple physical forces which can be easily broken, and consequently peeling or delamination may occur.

Such is not the case in chemical grafting

Since the attachment of coatings is accomplished by forming a chemical, covalent bond, much thinner coatings can provide extended life and superior adhesion. Successful grafting of a multitude of monomers and substrates such as metals, plastics, rubber, cellulosic materials, liquids and nature formed, living organisms can be accomplished. The chemical reaction that takes place on the surface provides a monomolecular layer of chemically bonded coating, which can be increased in thickness to the desired amount. Results have shown that coatings of ½ mil thickness can provide up to 2000 hours of salt spray protection.

2. In Depth Grafting

In many instances the fine layer of grafted material which can be easily deposited on the surface is not sufficient to alter and improve on the existing substrate. Sometimes it is necessary for the monomers to penetrate into a certain depth or even throughout the matrix of the substrate to perform correctly. For example, to achieve total wettability of plastics such as porous Teflon, nylon and many others, one must be able to chemically graft water absorbing chemicals in depth. Similarly, to obtain permanent flame retardancy, one must totally penetrate a textile or a bundle of yarn filaments or even saturated wood.

3. Laminating

In a multitude of applications it is necessary to combine more than one substrate together in a form of a laminate. Sometimes several layers of various materials are laminated (sandwiched) together to eventually have the specified characteristics. An off-the-shelf adhesive (glue) that is normally used for such applications will typically fail when temperature changes occur. The adhesive will fail in shear, when various layers comprising the laminate have different coefficient of thermal expansion.

To avoid such failures a group of graft initiators have been developed which can be instrumental in grafting difunctional monomers in such a way that one of the carbon-carbon chains will attach itself to one of the substrates at temperature $T^1$ and the other end will follow suit at some temperature $T^2$, higher than $T^1$. It is known, that carbon-carbon chains are in the form of a helix, which can extend and contract depending on temperature.

By utilizing this technology even substrates such as glass ribbon and polypropylene have been sandwiched and subjected to thermal shock without showing ill effects. In total, molecular grafting is a tool for the industry which permits alterations of the properties of substrates inexpensively, with very small dimensionally stable coating which outlasts all conventional and expensive ones.

Chemical Grafting

The idea that a second polymeric species can be attached by a covalent linkage to an existing polymeric material was first suggested in the late 1930's. A substance of this type was first produced in the laboratory in the early 1940's. Since that time, sufficient data has been accumulated about such processes, so that they have gained an important position for a variety of industrial applications. This method, where a "foreign" material becomes attached to another material by means of a chemical bond is referred to as "chemical grafting". One example is the production of acrylonitrile-butadiene-styrene (ABS) resin obtained by the direct attaching of styrene-acrylonitrile on to a polybutadiene backbone. This often is achieved by the polymerization of styrene and acrylonitrile in the presence of butadiene and is an example of chemical bonding technology.

Chemical grafting might be visualized as the growth of "whiskers" onto a material. These whiskers are joined to the substrate (basic material) by means of a chemical bond. This is in direct contradiction to ordinary coatings where the bond between the substrate and the coatings is only physical in nature. By chemical grafting a much higher degree of permanency is achievable.

Chemical grafting involves the activation of the substrate. Once the substrate has been activated, chains of monomers linked by carbon bonds grow on the substrate.

The present invention relates to a chemical resistant graft coating used on polyurethane for use in seating systems and other articles. It also relates to a method of grafting a protective coating in polyurethane parts for chemical resistance, water resistance and other adverse effects of the environmental condition of temperature, U.V. light, crocking along with excellent degree of abrasion resistance. Even when the polyurethane is coated with commercial coatings, they do not give the desired properties. These coatings adhere to the substrate through only physical bonds, they can be readily dislodged from the polyurethane substrate over a short period of time as moisture, oxygen and other corrosive gases permeate beneath the physically bonded polyurethane substrate. Thus, there is a need for a chemically bonded coating for polyurethane against abrasion, stain and U.V. resistance.

There are a number of patents that relate to chemical methods that allows for the activation and attachment of a wide variety of monomers to fabrics (for example, cotton, rayon, nylon, polyester, fiberglass, acrylics, polypropylene and the like), wood, paper, cellulose, metals (steel, copper, brass, lead aluminum, silver, zinc, etc), glass, plastics (polyethylene, polypropylene, Teflon, polyvinyl chloride, polycarbonate, polyethylene terephthalate, etc), Kevlar, biopolymers, hair (human and animal), human tissue (skin), liquid resins, liquid polymers, and the like.

For example U.S. Pat. No. 6,726,960 teaches a coated steel workpiece and a process for providing a steel workpiece with a coating of organic polymeric material, which comprises the steps of (i) applying to a surface of the workpiece a composition, comprising a) a polymerizable material that comprises at least one of epoxy prepolymers and urethane prepolymers; b) a monomer or prepolymer having at least one active group adapted to form graft polymerization linkages with the steel and with the polymerizable material containing hydroxyl, carbonyl, carboxyl, esters of carboxyl, amino, or epoxy group; c) catalytic initiator comprising ions of iron, silver, cobalt, or copper; and d) a peroxide; (ii) curing the resulting workpiece.

Moreover U.S. Pat. Nos. 3,188,228, 3,386,649, 3,873,407, 3,998,602, 4,875,410, 4,814,546, 6,001,894, 5,050,256, 5,741,548, 5,938,993, 5,278,200, 5,486,210, 6,358,557, US 2003/0046770, US2008/0007029, US 2003/0113497 relate to substrates with a coating layer.

Furthermore applicant has filed US 2014/0335362 for a method, composition, and device in relation to polyurethane seating which is an advance and improvement of the prior art including the prior art discussed above.

It is an object of this invention to increase the shelf life of the grafting composition, increase the stain resistance, UV resistance of exterior surfaces of beds, chairs, using the composition and method as described herein, as well as having a surface which is less shiny than applicants previous formulation as disclosed in US 2014/0335362.

Objective of the Invention

It is an object of this invention to provide a graft coating formulation to polyurethane articles for, stain resistance, water proofing, abrasion, chemical and U.V. resistance. The present invention is based on covering the polyurethane with a protective coating by chemically grafting organic monomers and prepolymers thereby forming a strong bonded polymeric film to the urethane substrate. The monomers/prepolymers are so selected that the polymeric film grafted onto polyurethane has excellent water proofing, abrasion, stain and U.V. and chemical resistance. The poly functional monomers and prepolymers are vinyl monomers, methacrylate monomers, urethane propolymers, acrylic prepolymers, styrene acrylic prepolymers, fluro polymers which are believed to be chemically bonded to the polyurethane substrate via amide hydrogen of urethane. The monomers are preferably acrylic, styrene acrylic, styrene butadiene, vinyl acrylic, or urethane having one or more hydroxyl, carboxyl and glycidyl group.

It is an aspect of this invention to provide a polyurethane part selected from the group consisting of the exterior surface of chairs, armrests, beds, mats, commodes, mattresses and cushions with a protective film chemically grafted thereon comprising monomers/prepolymers selected from the group of vinyl monomer, methacrylate monomer, urethane prepolymer, and acrylic prepolymer and fluro polymer.

It is another aspect of this invention to provide a method of grafting a coating onto a substrate comprising: a) preparing a mixture of (i) solvent including water (ii) a U.V. resistant compound (iii) a surfactant (iv) a monomer (b) mixing the mixture together (c) adding one by one and mix the following (v) urethane prepolymer (vi) fluro prepolymer (vii) water to define an admixture of monomers and prepolymers and (d) applying the admixture onto the substrate.

SUMMARY OF INVENTION

General

Grafting by definition means to transport or to be transported from one body to another in such a way that the new growth can continue. Similarly, chemical grafting involves the transplantation of monomers to various substrates, to improve their positive properties without any basic change to the substrate itself.

Basically, in order to initiate grafting, one must prepare the surface of the substrate to accept the graft. The graft initiators and chemical activators are a purely chemical way of exposing active sites on the surface of the substrate to initiate grafting. Application may be done by simply spraying, dipping or rolling.

The surface preparation as well as grafting itself are performed in single application within a very reasonable time period. Since monomers are the building blocks of all polymers, they are very small in size and light in molecular weight compared with polymers, and what is generally most important is that they are much less expensive than polymers.

The penetration of monomers is much greater than that of any other liquid and therefore pinhole-free coatings are easily obtainable.

In order to initiate grafting, one must prepare the surface of the substrate to accept the graft. The graft initiators and chemical activators to be described herein are a chemical way of exposing active sites on the surface of the substrate to initiate grafting. Application may be done by simply spraying, dipping or rolling, under atmospheric conditions.

The various types of graft initiators described herein permit, by adaptation, to graft an enormous variety of monomers to practically any imaginable substrate. The surface preparation as well as grafting itself are performed in a single application within a very reasonable time period. Since monomers are the building blocks of all polymers, they are very small in size and light in molecular weight, and what is important is that they are much less expensive than polymers.

Among the "permanent" properties that can be added are nonflammability, abrasion resistance, soil repellency, improve adhesion ion-exchange, ultraviolet protection, water absorbency, gas impermeability, bactericidal, fungicidal and many others too numerous to list. The areas of application of the resultant materials include textiles, plastics, pollution control, biomaterials, etc.

In addition to these types of materials, substrates which ordinarily would not be considered as possessing "active hydrogens" such as silicon, metals, polycarbonate can be utilized. In the latter situations sites for attachment are provided where possible by the removal of a hydrogen from the hydroxy form of a tightly bound oxide on the surface of the substrate or by the removal of labile electron which are available from the bulk of the material.

In essence the chemical grafting is consisted of growing polymer chains on a backbone chain of a substrate. The grafted polymer chains are formed from vinyl monomers, fluro monomers or monomers containing appropriate functionality, e.g. group such as acrylate, methacrylate, hydroxyl, carboxyl, epoxy, urethane, amide, amine, anhydride etc.

The penetration of monomers is much greater than that of any other liquid and therefore pinhole-free coatings are obtainable.

DETAILED DESCRIPTION OF THE INVENTION

Mechanism

Many materials, both naturally occurring and synthetic possess hydrogen which are more reactive than the "bulk hydrogens", for example, the tertiary hydrogen in polypropylene I, the amide hydrogen in proteins II and hydroxyl hydrogen n polysaccharides III.

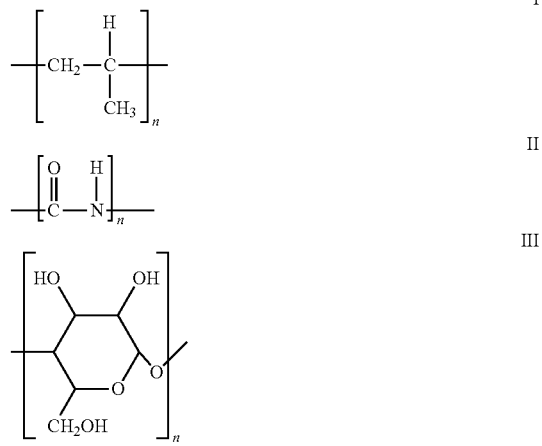

The chemical activator (C.A.) has the capacity of removing these active hydrogens and concomitantly initiating the growth of polymer chains at the site from where the active hydrogen was removed. In the case of polypropylene, this can be represented as follows:

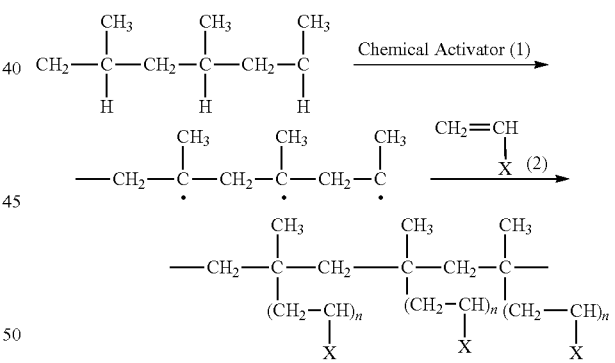

Where X can represent either a free radical, anion or cation, depending on whether the graft initiators (G.I.) removes a hydrogen and one electron, no electrons or two electrons, respectively. (There are a wide variety of monomers which do not lend themselves to the free-radical type of polymerization).

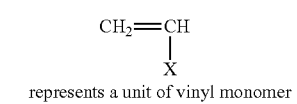

represents a unit of vinyl monomer where "X" governs the property or properties that are obtained. In many instances a mixture of monomers is employed and often more than one property can be altered in one processing step. These polymer chains, whose length can be controlled, are permanently attached to the "substrate". The linkage between the graft-polymer and the substrate is covalent in nature, therefore, the graft-polymer cannot be leached from the substrate, In addition to these types of materials, substrates which ordinarily would not be considered as possessing "active hydrogens" such as silicon, metals, polycarbonate sites for attachment are provided, where possible, by the removal of a hydrogen from the substrate or by the removal of liable electrons which are available from the bulk of the material.

General Mechanism for Grafting onto a Substrate

Chemical grafting comprises growing polymer chains on a backbone chain of a substrate. The graft polymer chains are formed from vinyl monomers containing appropriate functionability, e.g. groups such as hydroxyl, carboxyl, epoxy, amide, amine, anhydride, etc. The series of steps involved in the mechanism of chemical grafting to produce grafted polymer chains on the vinyl substrate, represented below:

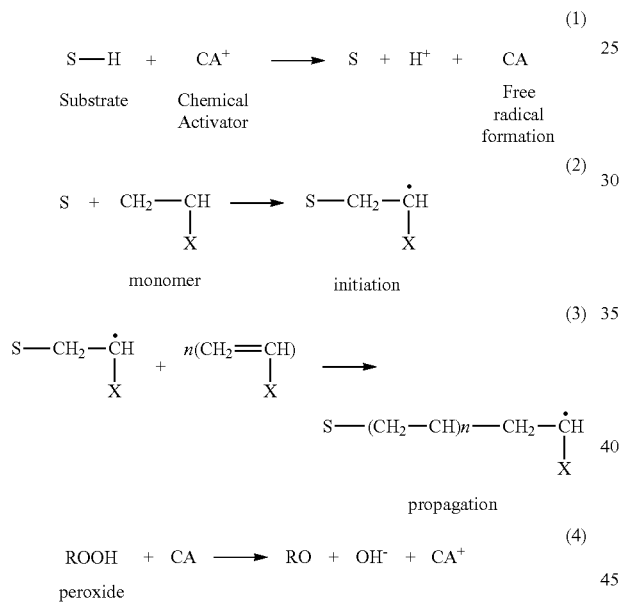

(Regeneration of the Chemical Activator and Free Radical)

This process may be terminated by radical combination.

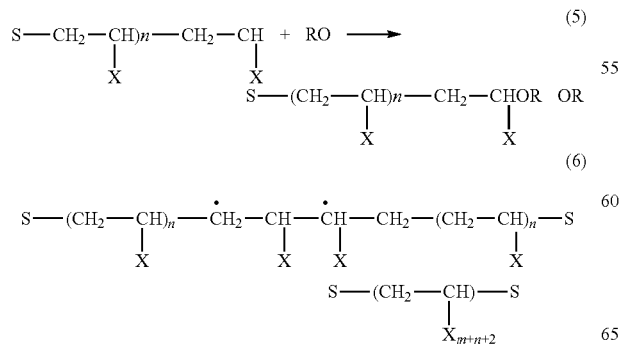

Reaction 6 especially should give a chemical bridge between the substrates, The side functional group .X could be chosen such that their further interaction with the substrate shall result into desired properties, e.g. adhesion, barrier properties and other characteristics.

The graft initiator ion starts the action and the whole process behaves like an anticatalytic one. A small amount of graft initiator ion (5 to 10 ppm) is therefore sufficient to carry out the process of graft polymerization. All of the foregoing reactions take place in the presence of peroxide which concurrently regenerates the graft initiator forming a free radical.

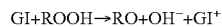

In the case of polyester, it is presumed the reaction takes in the following way:

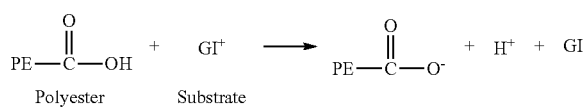

The free radical carbonyl group thereafter reacts with either a first component or a second component (e.g.

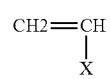

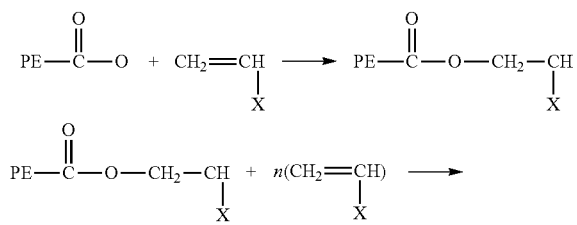

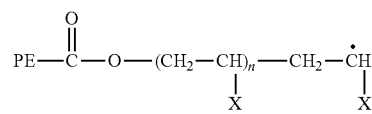

The process may be terminated by radical combination.

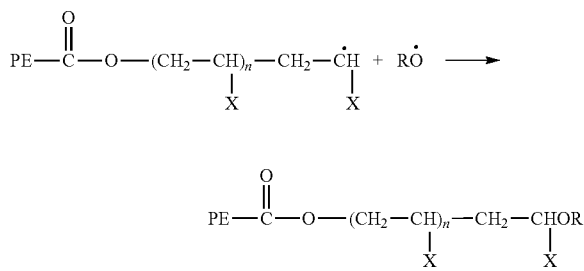

Chemical Grafting on Urethane/Polyurethane

The chemical grafting of polyurethane can be described by the following reactions:

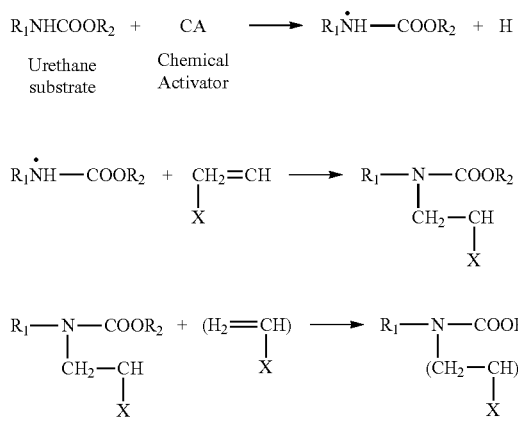

Further Discussion

In this description graft-initiation is portrayed as being separate and distinct from the subsequent graft-polymerization. For some applications this is the case. However, for a majority of the uses these steps can be combined due to the fact that the graft initiators possess sufficient selectivity such that almost no homopolymer is encountered.

This is true for the situation where the desired end result could be obtained by the attachment of a commercially available vinyl monomer. But there are cases where such a monomer is not available or where it might be advantageous to have a substance relatively loosely bonded (so as not to inactivate a functional group or destroy a particular conformation). Three approaches are possible for this type of situation:

A. Through a covalent linkage—Monomers of the acrylic acid type can supply a "handle" which allows for the attachment of the desired species to a substrate. If the species contains a hydroxyl group (either alcoholic or phenolic-A-OH),

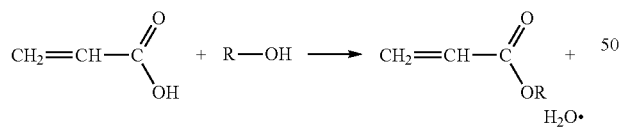

However, if it contains an amino group (R-NHR/),

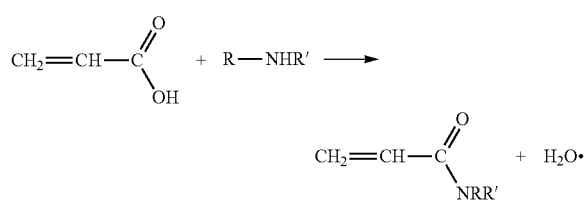

Finally, if it contains a carboxyl group (R-C( ),

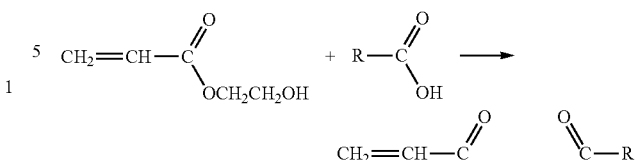

The rate of release of the desired species is governed by the kinetics for hydrolysis of classical esters and amides, B. Through an electrostatic bond—Permanent positive or negative charges can be introduced onto substrates by the use of monomers which contain permanent positive or negative charges.

a. Positive Charges

Many examples of quaternary-nitrogen-containing vinyl monomers are known or are readily available, e.g. benzyl 2-methyl-5-vinylpyridinium chloride,

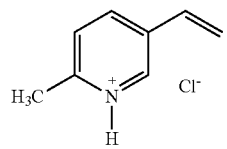

Substitution on the pyridine ring in various positions with both electron-donating and electron-accepting groups would provide for a series of vinyl monomers with a variety of strengths of positive charge. Another family could be obtained from vinyl anilinium salts,

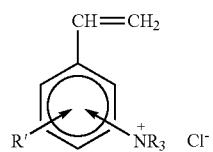

b. Negative charges

Families of vinyl monomers which contain salts of acids are known or may be readily synthesized, e.g., the vinyl benezenesulfonic acids:

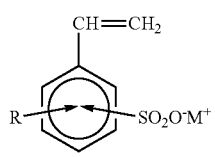

$M^+$ = Metal ion, e.g., $Na^+$, $K^+$

When permanently attached to a substrate, these monomers result in a permanently negatively charged surface.

In these instances, if the desired species has any positive or negative polarity whatsoever, it can be attached to a substrate of opposite polarity. Also, the judicious selection of the polar monomer attached to the substrate would allow for different strengths of attachment and therefore subsequent release, should this be desirable.

C. Through hydrogels introduced onto various materials—Hydrogels generally fall into two categories, hydroxyalkyl derivatives of acrylic or methacrylic acid and acrylamides. These highly swollen hydrogels are quite weak physically and generally it is advantageous to chemically graft them onto a substrate. The desired species are held to the hydrogel by Van der Waal's forces. Thus, the activity of an enzyme for example can be maintained in this type of system because both its active site and its conformation is unaltered. Release of the desired species is diffusion controlled.

Polyurethane may be defined as a polymer containing a plurality, carbonate linkages. The term polyurethane has also come to be used as a general name for the segment of the plastic industry which manufactures or uses polyisocyanates. A foundation of the polyurethane industry is the isocyanate. The physical form and properties of the polymer can also be tailored by selecting from among a broad range of monomers or attaching monomers by chemical grafting.

Generally speaking the chemical and structural diversity of the diverse materials that are called polyurethanes is broad so that it is difficult to describe them in terms of nominal or average properties. Combinations of properties that compare very favourably with those of engineering resins or monomers can be obtained with isocyoanate based polymers. Key polyurethane markets and applications include building and construction appliances, transportation, composite wood, recreation equipment, furnishings, coatings, adhesives, sealants elastomers, marine, medical and apparel.

Polyurethanes can be found in virtually any industry where performance is critical, whether it is through safe guarding efforts of protective coatings. Polyurethane coatings and sealants protect bridges, cars, airplanes etc. Polyurethanes should be the material of choices for applications needing designs freedom and dependable performance. Outdoor and recreation applications will continue to benefit from polyurethane's unique engineered characteristics. Innovative applications will also be found globally in high-tech medical instruments, hospitals and pharmaceutical labs from treatment of trolleys to operating microscopes.

EXAMPLES

The invention described herein can be applied to any number of polyurethane parts to toughen the surface. In one embodiment the invention has particular application to the hospital environment where the surface of beds or chairs are routinely cleaned and sanitized. However over time many of the exterior surface of chairs, beds or the like break down or become cracked, which become breeding grounds for bacteria, viruses and the like to grow. The surface of such chairs, armrest, beds or the like in some cases are comprised of polyurethane. The polyurethane may be a solid continuous surface. In other cases the surface may be comprised of a different material, such as, nylon or vinyl or the like where a polyurethane coating is applied thereon. In each of these cases there is a polyurethane substrate.

In an embodiment of this invention the methods require a grafting solution comprised of water, a catalyst for activating a graft initiator, a graft initiator which renders the substrate receptive to chemical grafting or bonding. The grafting solution also includes at least one monomer or prepolymer or an admixture thereof.

Generally speaking a monomer is a component having a molecular weight of less than 1200. It is especially preferred that at least one monomer has a molecular weight of from about 200 to 800. The prepolymer would have a molecular weight that would be greater than 1200.

The graft solution includes a graft initiator in order to provide an active site on the substrate for reaction. The graft initiator is selected to abstract an active hydrogen as previously described.

In a preferred embodiment the initiator is a metal ion provided by the ionization of a metal salt. When a salt such as a silver nitrate is utilized to activate the graft initiator such salts are preferably present in the graft solution in an amount from about 0.001% to about 0.01% by weight of the solution.

In an embodiment of the invention the graft solution includes a catalyst in order to ionize the metal salts to provide an activating ion. A wide variety of catalysts may be utilized in the method of the present invention including peroxide, peracid or a perbenzoate. Peroxide catalysts of urea, hydrogen and benzoyl peroxides are especially preferred. The catalyst is also present in a small amount. In one embodiment the grafting solution comprises 0.001 to about 0.01% weight of the catalyst.

In an embodiment of the invention the grafting solution would comprise an effective weight percentage of monomer and or prepolymer to provide a tough protective coating having a selected abrasion resistance. For example the grafting solution comprises from about 40 to 50 percent solids in an aqueous solution. Once dried and cured as described herein the protective surface comprises the chemically bonded monomer or prepolymer bonded to the polyurethane substrate backbone.

Method of Preparation of Formulation

A requisite amount of different precalculated quantity of styrene acrylic prepolymers, urethane prepolymers, epoxy prepolymers, acrylic prepolymers, pigments, coupling agents, thickeners, monomers surfactants, water, solvent, catalyst and graft initiator were taken in a container. The coating solution thus prepared is ready for application on the polyurethane substrate.

Method of Application of the Formulation

The coating formulation thus prepared is applied to the polyurethane substrate by spraying or any other convenient method. The coated polyurethane is air dried for 10-15 minutes and subjected to cure at 125-150° C. for 5-10 minutes. It should be noted that the following represent some examples and are not limiting. In other words it is possible to vary some of the ingredients and still obtain the desired results. Again as an example some of the ingredients may be changed by +/−15% or +/−10% and still obtain the desired results.

a) Example I

| FORMULATION | PARTS BY WEIGHT |
| --- | --- |
| Bulyt Carbitol | 40.00 |
| EEP Solvent | 20.00 |
| Antioxidant Irganox 1010 | 0.08 |
| U.V. Absorbent Tinuvin 292 | 0.08 |
| Non Ionic Surfactant Triton X-100 | 2.00 |
| Monomer Coatosil 1770 | 8.00 |
| Water | 200.00 |
| Flattening Agent Dapro FA-34 | 16.00 |
| -- Mix the above together then add one by one and mix the following . . . | |
| Silica modified Acrylic Prepolymer Chemtan AC-1 | 200.00 |
| Urethane Prepolymer Urotuf W 38 | 120.00 |

| FORMULATION | PARTS BY WEIGHT |
|---|---|
| Fluro Prepolymer Lumiflon FE 4300 | 80.00 |
| Fluro Propolymer Lumiflon FE 4400 | 80.00 |
| Acrylated Polyvinylidene Fluroide Prepo, Kynar Aquatic ARC | 160.00 |
| Acrylic Emulsion API 296 E | 24.00 |
| Fluro Dispersion AQ 50 | 20.00 |
| Melamine Prepolymer Cymel 385 | 24.00 |
| Water | 120.00 |
| Urethane Acrylate SR 9035 | 4.00 |
| Dodecyl Benzene Sulfonic Acid Nacure 5225 | 1.00 |
| Urea Peroxide 1.00% Solution in Water | 0.20 |
| Silver Perchlorate 0.1% Solution in Water | 0.2 |

An effective amount of the above identified chemicals is added to the mixture to obtain the desired properties. The chemical by weight referred to above can vary up to +1-15%

Generally speaking if more of a chemical is added relative the water the thicker, or more viscous the application.

b) Example II

| FORMULATION | PARTS BY WEIGHT |
|---|---|
| Bulyt Carbitol | 10.00 |
| EEP Solvent | 5.00 |
| Antioxidant Irganox 1010 | 0.20 |
| U.V. Absorbent Tinuvin 292 | 0.20 |
| Non Ionic Surfactant Triton X-100 | 0.50 |
| Monomer Coatosil 1770 | 2.00 |
| Monomer Silane A171 | 0.50 |
| Flattening Agent Dapro FA-34 | 5.00 |
| -- Mix the above together then add one by one and mix the following . . . | |
| Silica modified Acrylic Prepolymer Chemtan AC-1 | 54.00 |
| Fluro Prepolymer Lumiflon FE4300 | 30.00 |
| Fluro Propolymer Lumiflon FE4400 | 25.00 |
| Acrylated Polyvinylidene Fluride Prepo, Kynar Aquatic ARC | 30.00 |
| Silicon Modified Chemtan FA-22 | 04.00 |
| Fluro Dispersion AQ 50 | 10.00 |
| Melamine Prepolymer Resimene 717 | 06.00 |
| Water | 80.00 |
| Urethane Acrylate SR 9035 | 4.00 |
| Fluro Emulsion Rainoff FC-6 | 10.00 |
| Urea Peroxide 1.00% Solution in Water | 0.20 |
| Silver Perchlorate 0.1% Solution in Water | 0.20 |

An effective amount of the above identified chemicals is added to the mixture to obtain the desired properties. The chemical by weight referred to above can vary up to +/−15%. Generally speaking if more of a chemical is added relative the water the thicker, or more viscous the application.

c) Example III

| FORMULATION | PARTS BY WEIGHT |
|---|---|
| Bulyt Carbitol | 10.00 |
| Antioxidant Irganox 1010 | 0.08 |
| U.V. Absorbent Tinuvin 292 | 0.08 |
| Non Ionic Surfactant Triton X-100 | 2.00 |
| Monomer Coatosil 1770 | 8.00 |
| Dispersing Agent Irgosperse 2176 | 2.00 |
| Water | 200.00 |
| Flattening Agent Dapro FA-34 | 16.00 |
| -- Mix the above together then add one by one and mix the following . . . | |
| Silica modified Acrylic Prepolymer Chemtan AC-1 | 20.00 |
| Urethane Prepolymer Neopac E125 | 40.00 |
| Fluro Prepolymer Lumiflon FE 4300 | 80.00 |
| 2% Solution of FC 4430 in Water | 2.00 |
| Acrylic Emulsion API 296 E | 24.00 |
| Fluro Dispersion AQ 50 | 10.00 |
| Melamine Prepolymer Resimene AQ7551 | 20.00 |
| Water | 120.00 |
| Urethane Acrylate SR 9035 | 4.00 |
| Urea Peroxide 1.00% Solution in Water | 0.20 |
| Ferrons Amm. Sulfate 0.1% Solution in Water | 0.20 |

An effective amount of the above identified chemicals is added to the mixture to obtain the desired properties. The chemical by weight referred to above can vary up to +/−15%. Generally speaking if more of a chemical is added relative the water the thicker, or more viscous the application.

Discussion of Invention

According to the method and article of the present invention, chemical and abrasion resistant urethane seats are produced which are better than the conventional product, having improved UV resistance and a composition having improved shelf life. The resulting article or part also exhibits improved physical properties and an enhanced ability to withstand staining and improved U.V. resistance as compared to the prior art and as compared with applicant's US Published 2014/0335362.

The resulting coating layer admixture of the prepolymer and monomer can be varied depending on how far the reaction is carried out. The graft solution includes water, a graft initiator for activating sites on the polyurethane, a catalyst for activating or regenerating the graft initiator and a first component that has a functional group for reaction and covalent bonding with an active site for the substrate. If preferred it can be a water dispersible polymer such as for example an epoxy prepolymer, a urethane prepolymer and acrylic prepolymer. It is preferred that components comprises at least one water dispersible polymer which included at least one functional group, e.g.—a carboxyl, hydroxyl, epoxy, amino, melamine, fluro or acrylic group. These polymers are ideally suited for incorporation into grafting solutions; have sufficient graft segments so as to have a highly flexible graft polymer. The monomers can be an acrylate, methecrylate or urethane acrylate.

Coatings provide protection according to mechanisms. The First mechanism is impermeability. The coating must be inert to chemical and impervious not only to air, oxygen, water and carbon dioxide, but also to the passage of ions and electrons. It also must have good adhesion. Such coating prevents abrasion by suppressing the process and chemical graft is superior to ordinary coating and gives chemical and abrasion resistance particularly in the healthcare environment.

Acrylic and diacritic monomers having functional group such as carboxyl, hydroxyl, amino or ester are preferred. When a metallic salt such a silver nitrate, silver perchlorate, ferrous ammonium sulfate, silver acetate is utilized as graft initiator. Graft initiators are used in small quantities in order to ionize the metal salt to provide an activating metal ion, the graft solution includes a catalyst. A wide variety of catalysts may be utilized in the present invention. Peroxide of urea, hydrogen, and benzyl are used in most of the water based reactions. The catalyst functions to ionize metal salts into silver and iron or any other metal as graft initiator.

This invention has particular application to furniture in hospitals and especially for chairs and beds. The coating described can be sprayed over the seat including under the seat and over the seams so as to make the seat seamless and sealed with a tough outer surface that is difficult to puncture, chemically resistant, and resistant to abrasion. Furthermore the under surface of the seats can include brackets or clips (that are also sprayed with the coating) that engage with the frame of the chair so that the seat can be easily removed or popped off for cleaning and the seamless aspect of the seat can be maintained.

Furthermore chairs and beds in either hospital or hotel settings can have the outer surface or substrate made with the composition described so that the mattresses and seat cushions are sealed and seamless. This is highly desirable to combat bedbug infestations in hospitals and hotels as the treated surface will inhibit the infestation of these pests and prevent the spread of infection.

The invention described herein can be used on a variety of other articles such as anti-fatigue mats, commodes, mattresses and wheelchair cushions.

While it is apparent that the invention herein disclosed is well calculated to fulfill the objects above stated. It will be appreciated that numerous modifications and embodiments may be devised by those skilled in the art and it is intended that the appended claims cover such modification and embodiments as fall within the true spirit and scope of the present invention. It is within the scope of this invention to apply the grafting solution to polyurethane seating beds and other articles for abrasion, stain and chemical resistance, water proofing and other properties.

The invention claimed is:

1. A method of grafting a coating onto a substrate comprising:
   a) preparing a mixture of:
      a solvent including water,
      (ii) a UV resistant compound,
      (iii) a surfactant,
      (iv) a monomer,
      (v) a urethane prepolymer,
      (vi) Fluoroethylene-alkyl vinylether (FEVE) alternating copolymer and
      (vii) a graft initiator
   to define an admixture of monomers and prepolymers, and
   (c) applying the admixture onto the substrate.

2. The method of claim 1 wherein said admixture is sprayed onto said substrate.

3. The method of claim 2 further comprising drying said sprayed admixture for about 10 to 15 minutes and subjected to a cure of 125 to 150 degrees centigrade for about 5 to 10 minutes.

4. The method of claim 3 wherein said admixture comprises a first component that has a functional group for reaction and covalent bonding with an active site for the substrate.

5. The method of claim 4 wherein the first component is a water dispersible polymer.

6. The method of claim 5 wherein said water dispersible polymer comprises an epoxy prepolymer, a urethane prepolymer and an acrylic prepolymer.

7. The method of claim 6 wherein said water dispersible polymer includes at least one functional group selected from carboxyl, hydroxyl, epoxy, amino, melamine, acrylic group and fluoro group.

8. The method of claim 1 wherein said monomer is selected from the group consisting of acrylate, methacrylate, or urethane acrylate.

9. The method of claim 1 wherein said graft initiator is a metallic salt.

10. The method of claim 9 wherein said metallic salt is selected from the group consisting of silver nitrate, silver perchlorate, ferrous ammonium sulfate, and silver acetate.

11. The method of claim 10 including a catalyst selected from the group consisting of peroxide of urea, hydrogen, and benzoyl.

12. The method of claim 1 wherein the solvent includes butyl carbitol.

13. The method of claim 1 wherein the admixture composition comprises:

| FORMULATION | PARTS BY WEIGHT |
| --- | --- |
| Bulyt Carbitol | 40.00 |
| ethyl 3-ethoxy propionate Solvent | 20.00 |
| Antioxidant pentaerythritol tetrakis[3-[3,5- di-tert-butyl-4-hydroxyphenyl]propionate] | 0.08 |
| UV absorber | 0.08 |
| Non ionic surfactant octophenolpoly(ethyleneglycolether) | 2.00 |
| 3,4-(epoxycyclohexyl)ethyltriethoxysilane | 8.00 |
| Water | 320.00 |
| Silica Flattening Agent | 16.00 |
| Silica modified Acrylic dispersion mixture of acrylic polymers 18-19% , residual monomers <500 ppm, water 74-77% and amorphous silica 5-8% | 200.00 |
| Urethane Prepolymer | 120.00 |
| Fluoroethylene-alkyl vinylether (FEVE) alternating copolymer | 160.00 |
| modified poly vinylidene fluoride dispersion | 160.00 |
| fluoro emulsion | 24.00 |
| polyterafluoroethylene dispersion 50% in water | 20.00 |
| Melamine Prepolymer | 24.00 |
| Ethoxylated(15)trimethylolpropanetriacrylate | 4.00 |
| Dodecyl Benzene Sulfonic Acid catalyst | 1.00 |
| Urea Peroxide 1.00% Solution in Water | 0.20 |
| Silver Perchlorate 0.1% Solution in Water | 0.2. |

14. The method of claim 1 wherein the admixture composition comprises:

| FORMULATION | PARTS BY WEIGHT |
| --- | --- |
| Bulyt Carbitol | 10.00 |
| ethyl 3-ethoxy propionate Solvent | 5.00 |
| pentaerythritol tetrakis[3-[3,5- di-tert-butyl-4-hydroxyphenyl]propionate] | 0.20 |

-continued

| FORMULATION | PARTS BY WEIGHT |
|---|---|
| UV absorber | 0.20 |
| Non ionic surfactant octophenolpoly (ethyleneglycolether) | 0.50 |
| 3,4-(epoxycyclohexyl)ethyltriethoxysilane | 2.00 |
| vinyltrimethoxysilane | 0.50 |
| Silica Flattening Agent | 5.00 |
| mixture of acrylic polymers 18-19%, residual monomers <500 ppm, water 74-77% and amorphous silica 5-8% | 54.00 |
| Fluoroethylene-alkyl vinylether (FEVE) alternating copolymer | 55.00 |
| modified poly vinylidene fluoride dispersion | 30.00 |
| mixture of acrylic polymers 18-19%, residual monomers <500 ppm, water 74-77% and amorphous silica 5-8% | 04.00 |
| polyterafluoroethylene dispersion 50% in water | 10.00 |
| Melamine Prepolymer Methylated melamine formaldehyde resin | 06.00 |
| Water | 80.00 |
| Ethoxylated(15)trimethylolpropanetriacrylate | 4.00 |
| Fluoro Emulsion fluoro surfactant | 10.00 |
| Urea Peroxide 1.00% Solution in Water | 0.20 |
| Silver Perchlorate 0.1% Solution in Water | 0.20. |

15. The method of claim 1 wherein the admixture composition comprises:

| FORMULATION | PARTS BY WEIGHT |
|---|---|
| Bulyt Carbitol | 10.00 |
| Antioxidant pentaerythritol tetrakis[3-[3,5- di-tert-butyl-4-hydroxyphenyl]propionate] | 0.08 |
| UV absorber | 0.08 |
| Non ionic surfactant octophenolpoly (ethyleneglycolether) | 2.00 |
| 3,4-(epoxycyclohexyl)ethyltriethoxysilane | 8.00 |
| Dispersing Agent | 2.00 |
| Water | 320.00 |
| Silica Flattening Agent | 16.00 |
| mixture of acrylic polymers 18-19%, residual monomers <500 ppm, water 74-77% and amorphous silica 5-8% | 20.00 |
| Urethane acrylic prepolymer | 40.00 |
| Fluoroethylene-alkyl vinylether (FEVE) alternating copolymer | 80.00 |
| 2% Solution of fluoro surfactant in Water | 2.00 |
| Acrylic fluoro emulsion | 24.00 |
| polyterafluoroethylene dispersion 50% in water | 10.00 |
| Melamine Prepolymer fluoro dispersant Methylated melamine formaldehyde resin | 20.00 |
| Urethane Acrylate SR 9035 monomer | 4.00 |
| Urea Peroxide 1.00% Solution in Water | 0.20 |
| Ferrous Ammonium Sulfate 0.1% Solution in Water | 0.20. |

* * * * *